United States Patent
Munro et al.

(10) Patent No.: US 10,691,830 B2
(45) Date of Patent: Jun. 23, 2020

(54) SYSTEMS AND METHODS FOR PRESERVING PRIVACY IN DISTRIBUTION OF DIGITAL CONTENT USING PRIVATE TOKENS

(71) Applicant: Verimatrix, Inc., San Diego, CA (US)

(72) Inventors: Thomas A. Munro, La Jolla, CA (US); Niels J. Thorwirth, San Diego, CA (US)

(73) Assignee: Verimatrix, Inc., San Diego, CA (US)

( * ) Notice: Subject to any disclaimer, the term of this patent is extended or adjusted under 35 U.S.C. 154(b) by 168 days.

(21) Appl. No.: 16/067,573

(22) PCT Filed: Dec. 30, 2016

(86) PCT No.: PCT/US2016/069592
§ 371 (c)(1),
(2) Date: Jun. 29, 2018

(87) PCT Pub. No.: WO2017/117574
PCT Pub. Date: Jul. 6, 2017

(65) Prior Publication Data
US 2019/0012439 A1    Jan. 10, 2019

Related U.S. Application Data (60) Provisional application No. 62/273,043, filed on Dec. 30, 2015.

(51) Int. Cl.
*G06F 21/62* (2013.01)
*H04L 29/06* (2006.01)
(Continued)

(52) U.S. Cl.
CPC ........ *G06F 21/6254* (2013.01); *G06F 16/951* (2019.01); *G06F 21/16* (2013.01);
(Continued)

(58) Field of Classification Search
CPC .... G06F 21/6254; G06F 16/951; G06F 21/16; G06F 2221/0733; G06Q 20/065;
(Continued)

(56) References Cited

U.S. PATENT DOCUMENTS

| 5,734,720 A | 3/1998 | Salganicoff et al. |
| 6,389,538 B1 | 5/2002 | Gruse et al. |

(Continued)

FOREIGN PATENT DOCUMENTS

| EP | 3398049 A1 | 11/2018 |
| EP | 3398148 A1 | 11/2018 |

(Continued)

OTHER PUBLICATIONS

Extended European Search Report for European Application No. 16882768.1, Search completed Jun. 21, 2019, dated Jul. 9, 2019, 08 Pgs.

(Continued)

*Primary Examiner* — Amir Mehrmanesh
(74) *Attorney, Agent, or Firm* — KPPB LLP (57) ABSTRACT

Systems and methods for preserving privacy in distribution of content using private tokens in accordance with embodiments of the invention are disclosed. In one embodiment, a method of anonymously tracking a digital content and remediating unauthorized distribution includes generating a private token including an identifier distinguishable from tokens generated by other playback devices and the association with the playback device is not shared, receiving a portion of content, embedding a digital watermark in the content, where the digital watermark includes the private token, detecting an unauthorized copy of the content, extracting the digital watermark from the unauthorized copy of the content, broadcasting an enforcement message containing the private token to the playback devices, receiving (Continued)

the enforcement message, and performing an enforcement action on the playback device in response, where only a playback device that generated the private token responds.

14 Claims, 5 Drawing Sheets

(51) Int. Cl.
| | |
|---|---|
| *G06Q 30/02* | (2012.01) |
| *G06Q 50/00* | (2012.01) |
| *G06Q 30/06* | (2012.01) |
| *G06Q 20/06* | (2012.01) |
| *G06F 16/951* | (2019.01) |
| *G06F 21/16* | (2013.01) |
| *H04L 9/08* | (2006.01) |
| *H04L 9/30* | (2006.01) |
| *H04L 9/32* | (2006.01) |

(52) U.S. Cl.
CPC ........... *G06Q 20/065* (2013.01); *G06Q 30/02* (2013.01); *G06Q 30/0631* (2013.01); *G06Q 50/01* (2013.01); *H04L 9/0825* (2013.01); *H04L 9/0869* (2013.01); *H04L 9/3073* (2013.01); *H04L 9/3213* (2013.01); *H04L 63/0421* (2013.01); *G06F 2221/0733* (2013.01); *H04L 9/30* (2013.01)

(58) Field of Classification Search
CPC .... G06Q 30/02; G06Q 30/0631; G06Q 50/01; H04L 9/0825; H04L 9/0869; H04L 9/3073; H04L 9/3213; H04L 63/0421; H04L 9/30
See application file for complete search history.

(56) References Cited

U.S. PATENT DOCUMENTS

| | | | |
|---|---|---|---|
| 7,430,302 | B2 | 9/2008 | Thorwirth |
| 8,515,123 | B2 | 8/2013 | Thorwirth |
| 8,566,247 | B1 | 10/2013 | Nagel et al. |
| 8,995,711 | B2 | 3/2015 | Thorwirth |
| 2002/0052825 | A1 | 5/2002 | Bensemana et al. |
| 2002/0099948 | A1 | 7/2002 | Kocher et al. |
| 2004/0107356 | A1 | 6/2004 | Shamoon et al. |
| 2006/0062426 | A1* | 3/2006 | Levy ................. G06F 21/10 382/100 |
| 2007/0220266 | A1 | 9/2007 | Cooper et al. |
| 2007/0220575 | A1 | 9/2007 | Cooper et al. |
| 2007/0294173 | A1* | 12/2007 | Levy ................. G06F 21/10 705/51 |
| 2008/0140525 | A1 | 6/2008 | Lamsfuss et al. |
| 2009/0055650 | A1 | 2/2009 | Nakano |
| 2009/0254572 | A1 | 10/2009 | Redlich et al. |
| 2014/0026052 | A1 | 1/2014 | Thorwirth et al. |
| 2014/0325550 | A1 | 10/2014 | Winograd et al. |
| 2019/0012480 | A1 | 1/2019 | Thorwirth |
| 2019/0222878 | A1* | 7/2019 | Cocchi ................. G06T 1/0021 |

FOREIGN PATENT DOCUMENTS

| | | |
|---|---|---|
| WO | 2016061411 A1 | 4/2016 |
| WO | 2017117551 A1 | 7/2017 |
| WO | 2017117574 A1 | 7/2017 |
| WO | 2017117574 A8 | 6/2018 |

OTHER PUBLICATIONS

Extended European Search Report for European Application No. 16882783.0, Search completed Jun. 20, 2019, dated Jul. 9, 2019, 07 Pgs.
International Preliminary Report on Patentability for International Application PCT/US2016/069552, Report dated Jul. 3, 2018, dated Jul. 12, 2018, 8 Pgs.
International Preliminary Report on Patentability for International Application PCT/US2016/069592, Report dated Jul. 3, 2018, dated Jul. 12, 2018, 5 Pgs.
International Search Report and Written Opinion for International Application No. PCT/US2016/069552, Search completed Mar. 10, 2017, dated May 22, 2017, 11 Pgs.
International Search Report and Written Opinion for International Application No. PCT/US2016/069592, Search completed Feb. 21, 2017, dated Mar. 13, 2017, 6 Pgs.
Sherwood et al., "P5: A Protocol for Scalable Anonymous Communication", Security and Privacy, 2002. Proceedings. 2002 IEEE Symposium on, 2002, doi: 10.1109/SECPRI.2002.1004362, pp. 58-70.
Wang et al., "Anonymous Sensory Data Collection Approach for Mobile Participatory Sensing", Data Engineering Workshops (ICDEW), 2012 IEEE 28th International Conference on, Arlington, VA, 2012, doi: 10.1109/ICDEW.2012.78, pp. 220-227.

\* cited by examiner

SYSTEMS AND METHODS FOR PRESERVING PRIVACY IN DISTRIBUTION OF DIGITAL CONTENT USING PRIVATE TOKENS

CROSS REFERENCE TO RELATED APPLICATIONS

This application is a national stage of PCT Patent Application No. PCT/US2016/069592, entitled "Systems and Methods for Preserving Privacy in Distribution of Digital of Content Using Private Tokens" to Munro et al., filed Dec. 30, 2016, which claims priority to U.S. Provisional Application No. 62/273,043, entitled "Systems and Methods for Preserving Privacy in Distribution of Digital Content using Private Tokens" to Munro et al., filed Dec. 30, 2015, the disclosures of which are incorporated by reference herein in their entirety.

FIELD OF THE INVENTION

The present invention relates generally to detecting and stopping unauthorized distribution of digital content while protecting privacy of users and more specifically to using private tokens to notify playback devices that have distributed content without authorization.

BACKGROUND OF THE INVENTION

Digital communication has become commonplace in recent years. With more cost effective ways to gather and store data and more connected devices, the amount of data that is gathered is continuously growing. Consumers are aware of possible negative side effects and are interested in preserving their anonymity.

On the other hand, digital media is increasingly shared illegally and tracing is required to stop piracy. For this, digital media is commonly marked with an identifier that is registered with some properties of the playback device in a table that links identifiers to playback devices. If this marked content is distributed, the identifier points to the playback device. This can be used for analytics about the source of piracy, disentitle the device to receive further content, to notify an individual about legalities of piracy and to enforce legal actions against the owner of a device used to illegally obtain and distribute content in order to remediate the content leak and prevent further abuse. In some scenarios and jurisdictions there is a privacy concern when embedding information that relates to an individual device or group of devices. This can be addressed by decentralizing the assignment of the identifier, allowing privacy and anonymity for the owner of playback devices while still maintaining some mechanisms of anti-piracy. In addition to preventing an operator, law enforcement or copyright owner to understand the identity of an individual person or device, the decentralized storage also secures the data against leakage from a unauthorized access (or hack) of the centrally stored data, reducing the risk and required security effort of maintaining the system that otherwise identifies a large number of devices in a central database.

SUMMARY OF THE INVENTION

Systems and methods for preserving privacy in distribution of digital content using private tokens in accordance with embodiments of the invention are disclosed. In one embodiment, a method of anonymously tracking a piece of digital content and remediating unauthorized distribution includes generating a private token using a playback device, where the private token includes an identifier distinguishable from private tokens generated by other playback devices within a plurality of playback devices and the association with the playback device is not shared outside the playback device, receiving at least a portion of a piece of content using the playback device, embedding a digital watermark in the at least a portion of the piece of content using the playback device, where the digital watermark includes information including the private token, detecting an unauthorized copy of the piece of content, extracting the digital watermark including the private token from the unauthorized copy of the piece of content using an extraction server, broadcasting, using a remediation server, an enforcement message containing the private token to the plurality of playback devices including the playback device, receiving the broadcast enforcement message containing the private token using the playback device, and performing an enforcement action on the playback device in response to the broadcast message when the private token contained in the broadcast message matches the private token on the playback device, where only a playback device that generated the private token within the plurality of playback devices responds to receiving the broadcast message containing the private token.

In a further embodiment, generating a private token using a playback device includes generating a private token using a seed number encrypted with a secret key that is unique and permanently associated with the playback device.

In another embodiment, generating a private token using a playback device includes generating a private token using a device identifier that is unique to and associated with the device.

In a still further embodiment, the method also includes generating new private tokens in regular intervals using the playback device.

In still another embodiment, performing an enforcement action is enforced and executed by an enforcement application on the playback device.

In a yet further embodiment, the enforcement application is a content decryption module.

In yet another embodiment, the private token is a public key of a public and private key pair for asymmetric encryption and the enforcement message is secured using the public key to be decrypted with the private key.

In a further embodiment again, the digital watermark is a human-imperceptible mark on at least one frame of the content.

In another embodiment again, the digital watermark is a human-perceptible mark on at least one frame of the content.

In a further additional embodiment, the digital watermark is embedded as meta information in the header of the file containing the digital content.

In another additional embodiment, detecting an unauthorized copy of the piece of content including crawling the internet for unauthorized content using a crawler.

In a still yet further embodiment, detecting an unauthorized copy of the piece of content including scanning a peer-to-peer network for unauthorized content using a crawler.

In still yet another embodiment, the enforcement action includes disabling playback of any content on the playback device.

In a still further embodiment again, the enforcement action includes displaying a visible message when playing back content on the playback device.

In still another embodiment again, detecting an unauthorized copy of the piece of content is performed by the extraction server and the method also includes extracting the private token from the digital watermark using the extraction server and sending the private token from the extraction server to the remediation server.

DETAILED DISCLOSURE OF THE INVENTION

Turning now to the drawings, systems and methods for preserving privacy in distribution of digital content using private tokens are illustrated.

In several embodiments, a private token is a client identifier such as random number string that is generated on and stored on a specific client playback device and associated with the playback device and/or a user account. The private token is embedded by the playback device within digital content played on this device. When an unauthorized copy of the content is found, having been marked with the private token, it can be concluded that the device that generated the token was the source of the leak, however, without any entity having the ability to identify the device other than the device itself. In this way, the device and users can remain anonymous while enforcement can be maintained. The device can now be called to stop the illicit activity by sending a message to all devices in broadcast and the responsible device that generated the token will be forced to perform an enforcement action, for example, to cease to download content. In order to ensure that, the enforcement mechanism can be combined with DRM (or content decryption) modules that are decrypting the content. The ability to broadcast a message that is intended for a single, unidentifiable playback device and to communicate anonymously are characteristics of communication protocols that can be useful to implement embodiments of the invention. In the context of this discussion, broadcasting a message means sending the same message to several recipients or allowing several recipients the ability to access the message e.g. via download. This may be performed on traditional unicast or broadcast networks or protocols.

It has the advantage, as will be discussed with reference to embodiments of the invention, of not identifying any particular receiving network-connected device and thereby providing an amount of anonymity and privacy.

Content Leak Remediation System Architecture

Figure 1:
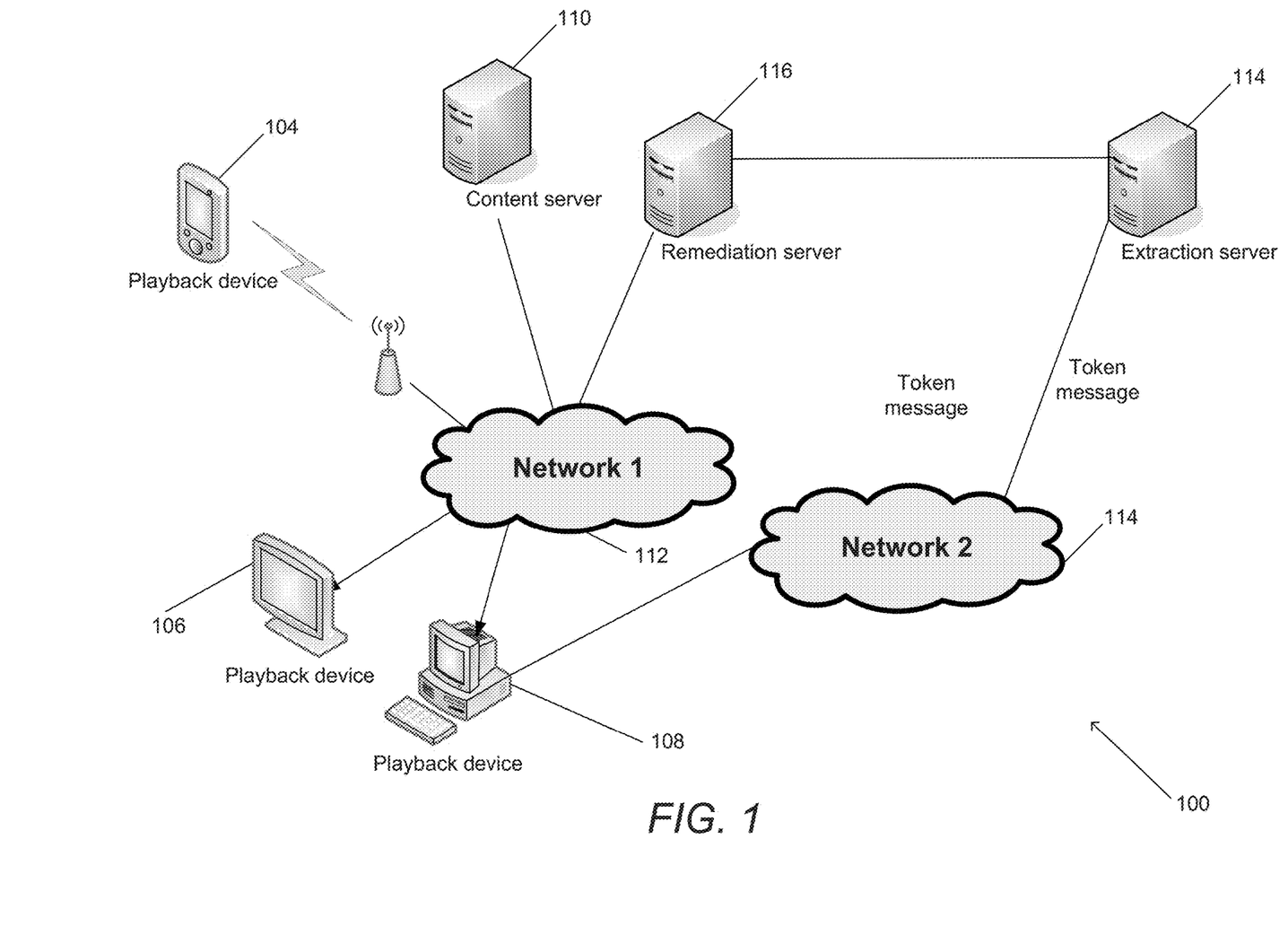
FIG. 1 is a system diagram of a content leak remediation system utilizing private tokens in accordance with embodiments of the invention.

In many embodiments of the invention, a content leak remediation system utilizing private tokens includes a remediation server that can broadcast a message containing a specific private token to multiple playback devices, one of which responds to the message by performing an enforcement action. A content leak remediation system in accordance with embodiments of the invention is illustrated in FIG. 1. The illustrated system 100 includes a remediation server 116 configured to distribute enforcement messages. In several embodiments, enforcement messages are sent as a broadcast to multiple playback devices. Broadcasting messages in this way may utilize a protocol capable of broadcast addressing or a unicast protocol that addresses multiple individual devices. A comparable distribution can also be accomplished by allowing several playback devices to download the same information.

A variety of playback devices (also called client devices here) 104, 106, and 108 can request and receive portions of content from a content server 110 over a first network 112 such as the Internet, which can be Internet based such as over-the-top (OTT) streaming or other types of content distribution such as satellite, cable or IPTV. At least one playback device 108 has communication to a second network 114 on which it has shared a piece of content, which is marked with the device's private token, without authorization. The second network 114 can be any type of distribution network on which content can be shared, such as peer-to-peer, streaming, torrent, or pirated BluRay discs or other physical media. An extraction server is connected to the second network 114 and is configured to discover the unauthorized content and extract the private token. In other embodiments, discovery is performed by a separate crawler that scans the network 114 for illicit content and passes discovered content to the extraction server 114, which extracts the private token from the content. Remediation server 116 is connected to the extraction server 114 directly or via a network and receives the private token from the extraction server 114.

Playback devices 104, 106, and 108 can receive a broadcast enforcement message from the remediation server 116 via the first network 112 or a third network that is capable of broadcast addressing and communication. In further embodiments, any of content server 110, extraction server 114, remediation server 116, and/or the crawler may be combined into a single platform.

In the illustrated embodiment, playback devices include mobile phone 104, television 106, and personal computer 108. In other embodiments, playback devices can include any of various types of consumer electronics devices such as, but not limited to, DVD players, Blu-ray players, set top boxes, video game consoles, tablets, ebook readers, game consoles and other devices that are capable of connecting to a server and playing back digitally encoded media that can be marked, such as, but not limited to, videos, tv, music, ebooks, computer games, pdfs, webpages, virtual reality content and other.

Although a specific content leak remediation system architecture for delivering enforcement messages is discussed above with respect to FIG. 1, any of a variety of streaming systems can be utilized to perform content leak remediation in accordance with embodiments of the invention.

Figure 2A:
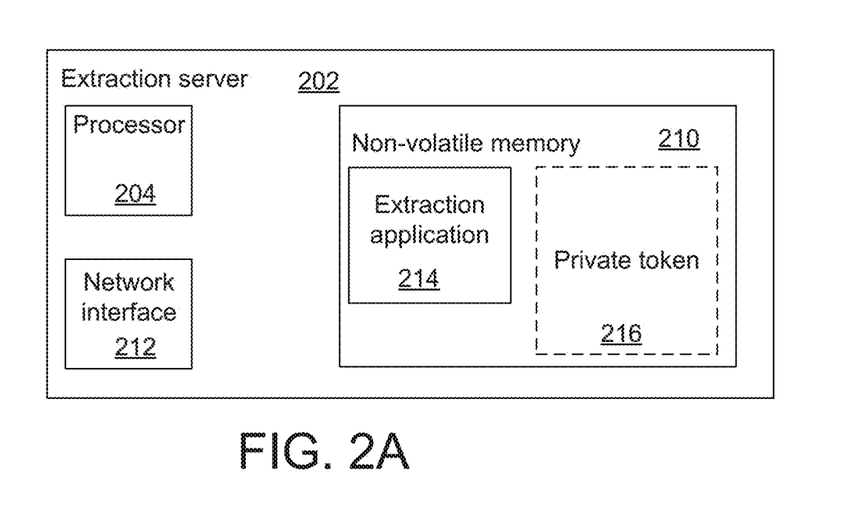
FIG. 2A conceptually illustrates an extraction server configured to extract a private token from a marked piece of content in accordance with embodiments of the invention.

Extraction servers in accordance with many embodiments of the invention are configured to load an extraction application as machine readable instructions from memory or other storage. An extraction server in accordance with many embodiments of the invention is illustrated in FIG. 2A. The extraction server 202 includes a processor 204, non-volatile memory 210, and a network interface 212. Non-volatile memory 210 includes an extraction application 214. The extraction application 214 configures the extraction server 202 to extract a private token 216 from a watermarked piece of content and provide the private token 216 to a remediation server. In some embodiments the extraction server is also configured to discover an unauthorized piece of content, e.g., from web sites and/or piracy networks. In other embodiments, a separate crawler is configured to scan or crawl web sites and/or piracy networks for illicit content and provides the discovered content to the extraction server.

Figure 2B:
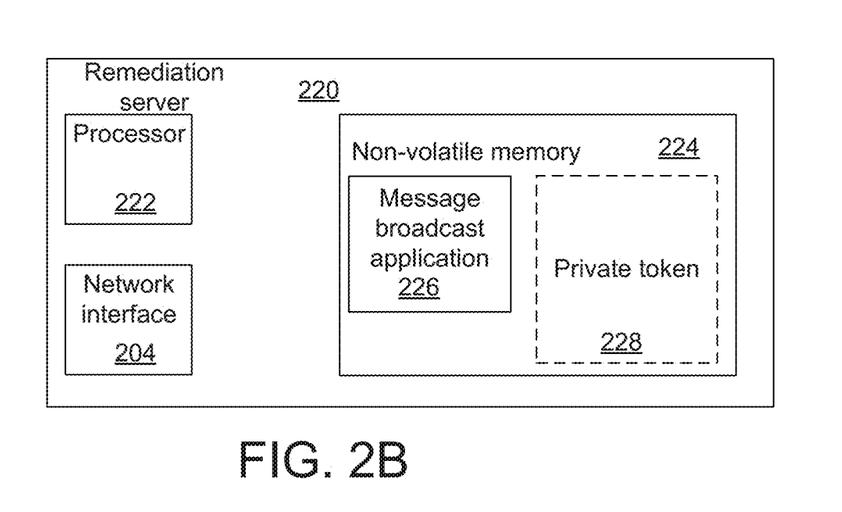
FIG. 2B conceptually illustrates a remediation server configured to distribute enforcement messages in accordance with embodiments of the invention.

Remediation servers in accordance with many embodiments of the invention load a message broadcast application as machine readable instructions from memory or other storage. A remediation server in accordance with an embodiment of the invention is illustrated in FIG. 2B. The remediation server 220 includes a processor 222, non-volatile memory 224 that includes a message broadcast application 224, and a network interface 226. In the illustrated embodiment, the message broadcast application 224 configures the processor 204 to perform processes such as those discussed further below to receive a private token for a playback device that has been compromised and should be disabled or restricted in playback of content, and to broadcast an enforcement message to playback devices. In several embodiments, a message broadcast application can be loaded from any kind of memory or storage device including volatile memory in accordance with many embodiments of the invention.

As will be discussed further below, broadcast messages can be sent containing the private token to playback devices so that the device having the private token reacts upon receipt without the content server, remediation server, and/or extraction server being able to identify the playback device. A private token can also be used for other purposes as discussed below. In different embodiments, the extraction application 214 and message broadcast application 226 and other functionality such as crawling to discover pirated content and delivering content can be implemented as a single application on the remediation server or as separate applications on separate servers (e.g., an extraction server, a remediation server, content server, and/or crawler server). In several embodiments, a separate application is used if the extraction server is used for several networks, e.g. the payload contains an identifier of the distribution network (112) together with the private token. In this case the extraction servers can identify the remediation server that can be used to broadcast a message to that distribution network.

Figure 3:
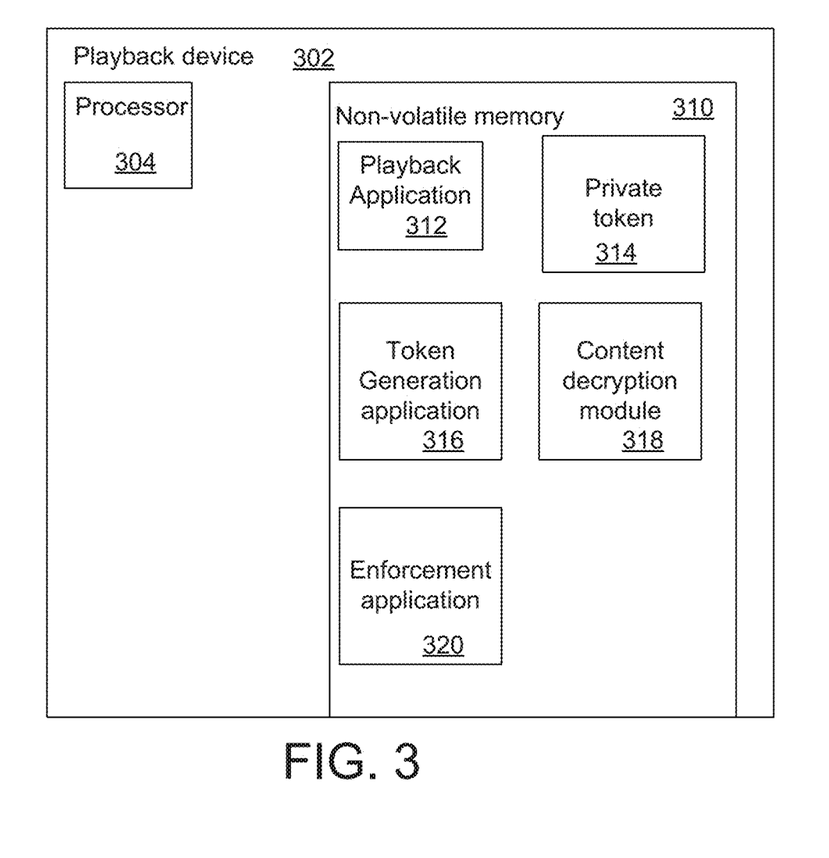
FIG. 3 conceptually illustrates a playback device configured to receive and play back content, generate a private token and receive broadcast messages, in accordance with embodiments of the invention.

Playback devices in accordance with many embodiments of the invention can load a playback application as instructions from memory. A playback device in accordance with an embodiment of the invention is illustrated in FIG. 3. The playback device 302 includes a processor 304 and non-volatile memory 310 that includes a playback application 312, token generation application 316, and ability to at least temporary store a private token 314. In many embodiments, the applications can be loaded from any kind of memory or storage device including volatile memory in accordance with many embodiments of the invention. In the illustrated embodiment, the non-volatile memory 310 is utilized to store instructions that configure the processor 302. Here, the non-volatile memory 310 contains the instructions of a playback application 312, which can be utilized to configure the processor 304 to receive and decode media content. In further embodiments, an enforcement application 320 configures the processor to receive an enforcement message from a remediation server and take certain enforcement actions when an enforcement message containing a token is received by the playback device as will be discussed further below.

The token generation application 316 can configure the playback device 302 to generate a private token 314 using a process such as those discussed further below. In many embodiments, a private token is typically stored on the playback device and the token's association with the device is not disclosed to any other entity. When a private token is used to watermark a piece of content and an unauthorized copy of the piece of content leaves the playback device, another entity may extract the private token from the content. In additional embodiments, a private token may be provided to a server for anonymously purchasing content, anonymously reporting viewing statistics, or other purposes. Additional purposes for a private token that may be utilized in accordance with embodiments of the invention are described in PCT Patent Application No. PCT/US16/69552 to Thorwirth entitled "SYSTEMS AND METHOD FOR RETROACTIVE ASSIGNMENT OF PERSONALLY IDENTIFIABLE INFORMATION IN DISTRIBUTION OF DIGITAL CONTENT," the relevant disclosure from which is hereby incorporated by reference in its entirety. In many embodiments of the invention, disclosures of the private token to another entity are only made by secure (e.g., encrypted) and/or anonymous methods whereby the playback device and/or user identity (e.g., user account) associated with the private token cannot be identified. In this way, the user can maintain his or her privacy.

As will be discussed further below, when an unauthorized copy of the content is discovered, the private token may be extracted from the content and a message containing the private token may be broadcast to playback devices to disable or modify playback or enforce any of a variety of restrictions on the playback device that generated the private token. In other embodiments, the message may be stored in a location remote from the playback devices, and a playback device may fetch the message in a way that cannot be traced back to the playback device that generated the private identifier.

Although a content leak remediation system utilizing private tokens is described above with respect to a specific extraction server, remediation server and playback device, any of a variety of transmitting or decoding systems can be utilized in the transmission and decoding of content as appropriate to specific applications in accordance with embodiments of the invention.

Token Generation

In many embodiments of the invention, a private token is generated or selected by a playback device to identify that device or a user account on the device, and is not known by any other entity (e.g., device or server) to be associated with that device or user account, and the device that generated the private token cannot be easily identified from the private token. As discussed below, any of a number of techniques can be utilized alone or in combination to select or generate a private token for a playback device in accordance with embodiments of the invention.

A private token may be a random or pseudo-random number. Collision may occur where two or more devices have the same private token. The risk of collision can be reduced by using a high degree of randomness in generating the number and/or using large numbers as tokens.

In several embodiments, a private token is generated using a device number, known to the playback device only derived from hardware such as a harddrive ID, MAC address chip serial, graphics card serial.

In additional embodiments a private token is generated using a device number or other fixed, seed number in combination with a random or pseudo-random number encrypted with a secret key that is unique and permanently associated with the playback device or user account. The playback device can provide proof of originating transactions by including the fixed, seed number.

In some embodiments, a private token is generated from a device identifier that is unique to and associated with the device. A device identifier may be static and may have been generated during device provisioning or registration. The device identifier may be unique to the device. Also, a serial number of a device component such as hard drive, chip, soundcard, may be used directly or after a transformation such as hashing. These existing identifiers are useful, in particular since they may be unique, static and not traceable if not record of the link to the device exists.

A private token may be generated using encryption, where the process of generating the private token includes selecting an encryption key.

A private token may be generated using a hash algorithm using a device identifier, such that the device identifier cannot be recovered using only the private token, but it can be verified that the private token was generated using that device identifier by performing the hash again and comparing the results. The hash can be seeded for greater variety over time and the seed may be provided by broadcast message to all playback devices.

A private token may be a public key in an asymmetric key (encryption) scheme or, to reduce the size, a hash thereof. The key pair could be generated by the playback device and the private key utilized in the scheme would be known only to the device or user and not released to the public. This allows a playback device to prove that it had generated the token and allows a broadcaster of a message to encrypt the message in such a way that only the private token holder, the playback device, can decrypt using the private key. In several embodiments, an enforcement message is broadcast that contains information, such as a decryption key, that is encrypted using the public key of the targeted playback device associated with that public key.

In several embodiments of the invention, a private token is changed frequently to prevent disclosure, such as repeated use of the same private payload, to entities other than the playback device and/or server. It may be encrypted using a shared secret key that is known to the playback device and the server or using a public key associated with the server. This allows the server to derive an encryption key from the playback device to establish secure communications.

In additional embodiments, a private token includes a component that is static and associated with a group of playback devices, e.g. certain members of a network, such that broadcast messages are accessible to the group. The component can be any type of additional information identifier such as, but not limited to, a time stamp and/or device type. A static number will allow the anonymous identification of repeat offenders which may be desired.

The generation and change to the private token may be signaled to and/or requested by the user's playback device to foster transparency or discourage illegal content distribution.

In some embodiments, the user's playback device may generate its own private identifier like a pseudonym or alias. Typically in such embodiments this cannot be altered at will, since a user who is distributing content may not want to avoid enforcement actions if his playback device will receive them. However, there can be scenarios where the person able to choose the alias or pseudonym can be trusted e.g. a system administrator that is choosing an ID for a group of users or on campus or scenarios where no enforcement action is envisioned.

In some applications the information is not used to enforce actions to stop illegal distribution but to monitor legal distribution, e.g. the watermark can be used to identify if it is a repeat uploader that is sharing distributing advertisement. In this case, the content owner may not want to stop the distribution but understand it.

The token may be combined with public information such as OS version, or timing to analyze piracy but this information may be vague enough to allow personal identification.

The token may be the same for each device but may also apply to larger groups such as domains, i.e. several devices in one household or account that would share a token. e.g. derived from a domain identifier. Similarly a token can be derived from a user account or login. In this case, to keep the domain or user login confidential the derivation process is unknown (e.g. inclusion of a secret key) or not reversible like e.g. a hashing function.

Token Length and Collision

Collision may occur where two or more playback devices independently generate the same private token R by accident e.g. as output of a random process. This scenario can cause confusion among the playback devices as messages or actions that are meant to apply to one device having the private token R may affect all the devices having the same private token R. The likelihood of collision can be expressed as the well-known birthday problem, for example, the probability that some pair of randomly chosen people in a set will have the same birthday (see https://en.wikipedia.org/wiki/Birthday_problem#Probability_table). For a token length of 32 bits and 2,900 devices, the probability is 0.1% that two or more devices are using the same hash. For larger populations a longer token may be chosen, e.g., for a length of 64 bits and 190,000,000 devices the probability is 0.1% that two or more devices are using the same hash. Even longer token lengths would result in lower likelihoods, for example, for a length of 128 bits and $2.6 \times 10^{13}$ devices, the probability is $p=10^{-12}$. A longer token length can be chosen as appropriate to a particular application considering any burden on communications efficiency. The risk of collision may also be limited and could be that a device that is not responsible for illegally distributing content is disabled for a limited period of time.

Forensic Watermark Tracking

Private tokens may be utilized in combination with digital watermarking for leak detection and to combat piracy without allowing playback devices and/or end users that may be pirating or redistributing content to be identified. In several embodiments according to the process discussed below, a private token generated on a playback device is stored securely only on the playback device and the association of the private token to the playback device and/or user account is not disclosed to any entity besides the playback device. A watermark can be embedded on content using the private token, for example, if the private token is an alphanumeric string, the string or some information from which the string can be recovered can be marked onto the content. Digital watermarks can be implemented as visible or imperceptible marks in video content. Watermarks can identify the source of the content, the intended consumer or receiver of the content, or be used for other purposes useful to tracking of protected content. Systems and method for embedding watermarks in video content include those discussed in U.S. Pat. No. 7,430,302 entitled "Covert and Robust Mark for Media Identification," U.S. Pat. No. 8,515,123 entitled "Efficient Watermarking Approaches of Compressed Media," U.S. Pat. No. 8,995,711 entitled "Efficient Watermarking Approaches of Compressed Media" the disclosure from which relevant to embedding watermarks in video content is hereby incorporated by reference in its entirety. Other methods to mark the content can be considered digital watermarks in this context, including meta information or private information embedded in the file structure of a codec or wrapper format or header. This information may be hidden or obfuscated. Marks may also be expressed as unnoticeable slight modification of insignificant information such as extra spaces in text or least significant bits in pixels. Other digital watermarks include visible messages overlaid on content. Content that can be watermarking with these and other mechanisms include video, audio, text, computer games, 3D models and executable or compilable computer code. One skilled in the art will recognize that any of a variety of mechanisms can be used to mark content with a private token in accordance with various embodiments of the invention.

When an unauthorized copy of the content is detected, the private token can be recovered from the watermark, although the playback device associated with the private token cannot directly be identified from the token. An enforcement message containing the private token can be broadcast to all playback devices making sure also the originating device will receive it and the sender will not identify the device. Upon reception, the playback device associated with the private token may respond by performing a specified enforcement action, such as restricting playback.

Figure 4:
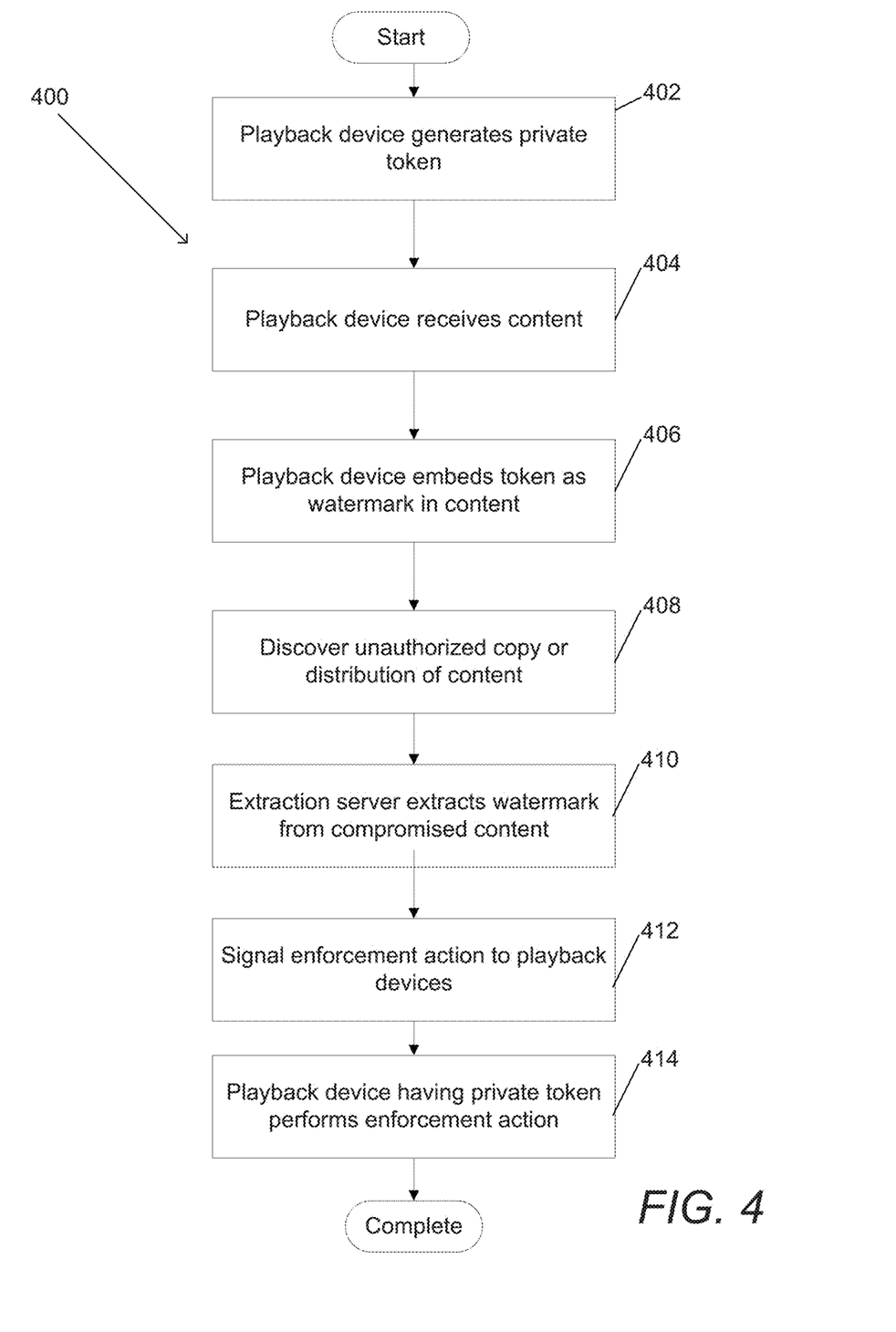
FIG. 4 illustrates a process for detecting unauthorized distribution of protected content and enforcing remedial action on the responsible playback device using a private token in accordance with embodiments of the invention.

A process for forensic watermark tracking using private tokens in accordance with embodiments of the invention is illustrated in FIG. 4. The process 400 includes generating (402) a private token R by a playback device using one or more token generation techniques such as those discussed further above. The playback device receives (404) portions of content from a content server. In some embodiments, the playback device requests content from the server using HTTP or a similar transport protocol. In other embodiments, the content is broadcast to a set of playback devices. In additional embodiments, content may already be stored on a playback device or may be read from media.

The playback device embeds (406) the private token R in at least a portion of the content as a watermark, a portion of a watermark, as source data in generating a watermark, as information from which the private token R can be recovered, or as associated metadata. The embedding may occur repeatedly and with different techniques. In several embodiments, the private token R is combined with other additional information before being embedded as a watermark. For example, the playback device may receive watermark payload information from the content server (or another server) along with the content that it receives. The watermark payload information may be used with the private token to generate the final watermark that is embedded in the content. In further embodiments, none of the additional information embedded together with the private token as a watermark can be traced back to or identified with the playback device, thereby preserving the privacy of the user by inhibiting identification of the playback device.

In some embodiments, the watermarking is performed on the playback device by a watermark module or application. The disabling of the watermark embedding can be deterred by enforcing the executing of modules or applications that embed the mark within the playback device. This may involve the content decryption module, also called DRM (digital rights management). The modules or applications can be assured proper execution with the use of additional information received from a content server. In additional embodiments, the content decryption module performs the enforcement action(s) triggered by receipt of an enforcement message from a remediation server. Systems and methods for securing modules within a playback device from being bypassed include those discussed in PCT Patent Application No. US2015/055826 entitled "Securing Communication with a Control Module Using a Key Contribution" the disclosure from which relevant to securing modules within a playback device is hereby incorporated by reference in its entirety. In several embodiments, the additional information includes key contribution that can be used to link the execution of a watermarking module or application with the decryption of the content.

The owner or distributor of the content may learn (408) that the content has been leaked or copied outside an authorized distribution channel. The unauthorized distribution may be discovered, for example, by finding the content on a network or service known to have piracy and other unauthorized activity where the content is made available without proper licensing. In several embodiments, a web crawler or other server scans web sites or distribution networks for unauthorized copies of content and an extraction server extracts the private token R from a watermarked piece of content found by the crawler. In some embodiments, a single server can perform both duties of crawling (or scanning) and extraction. The watermark including the private token R is read from an unauthorized or illegitimate copy of the content and the private token R is extracted (410). The playback device having private token R is concluded to be the source of the unauthorized distribution of the content, although the identity of the playback device is not known to entities other than the device itself.

An enforcement action is signaled (412) to a set of playback devices. In several embodiments, the signaling is sending an enforcement message that contains the private token R or information indicative of R (e.g., a hash) from a broadcast server to a set of playback devices. The enforcement message can optionally include information indicating the type of enforcement (e.g., disabling or restriction) that the playback device having private token R is meant to perform. In some embodiments, the broadcast server can receive the private token R from the extraction server. In other embodiments, the broadcast server and the extraction server are the same server. In many embodiments, the set of playback devices include the playback device that generated the private token R. In several embodiments, the message is sent by broadcast to the playback devices over a content distribution network such as, but not limited to, a DVB (digital video broadcasting) satellite, terrestrial or cable network, the public Internet, mobile or IPTV networks. Broadcasting may include the sending of the message to playback devices or playback devices retrieving information by e.g. downloading. E.g. playback devices are enforced to download (out of band) and evaluate information from the Internet. Enforcement may be accomplished by combining the message with information required for further content playback. Broadcast messages in DVB system can be expressed as EMM or ECMs send to all devices in the media stream. Other implementations include message to apps (applications or programs eg. from app stores) and app updates.

Figure 5:
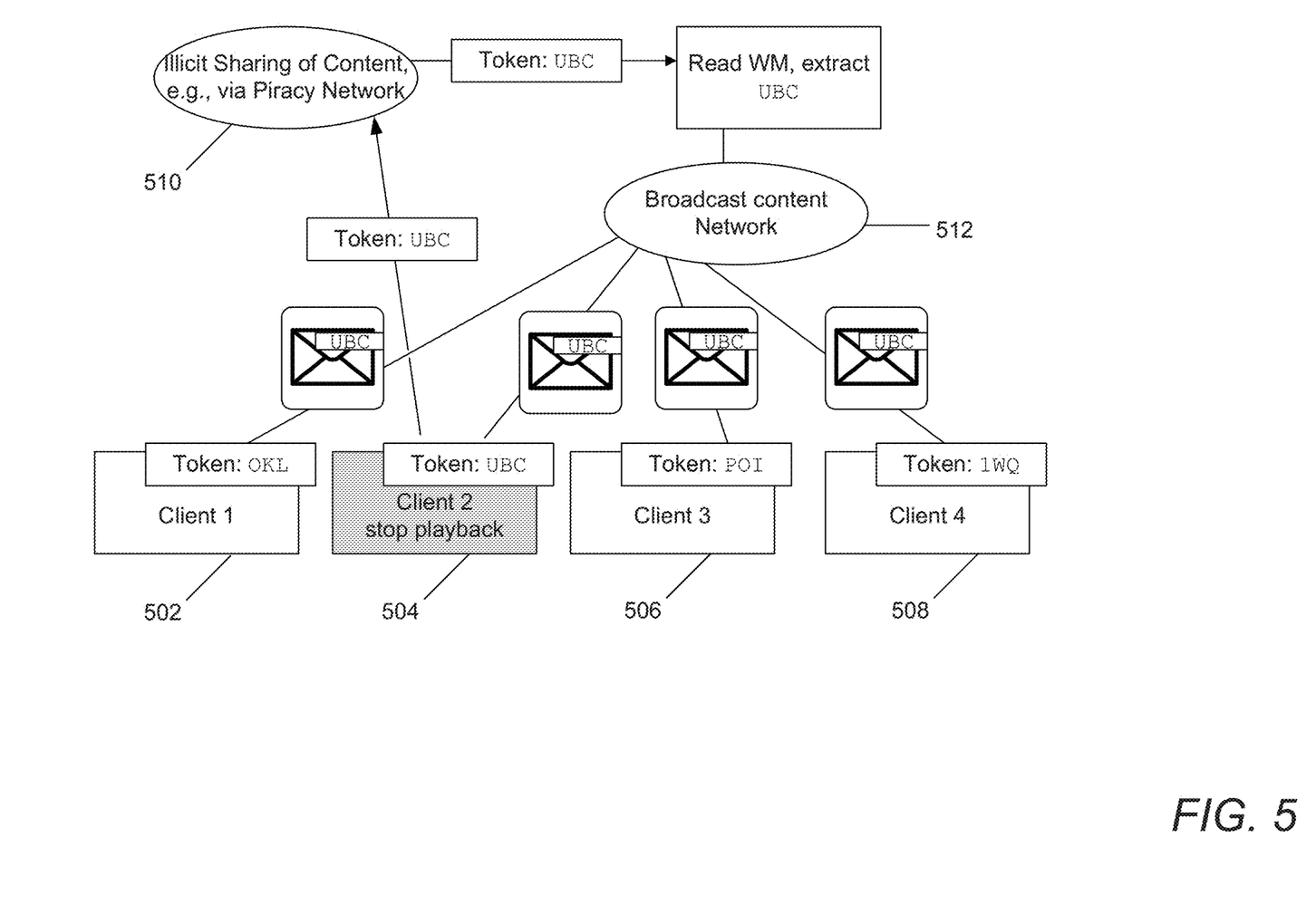
FIG. 5 illustrates private token usage through the embedding in, distribution with and recovery from illicitly distributed content and messaging remedial action on the responsible playback device in accordance with embodiments of the invention.

The playback device having private token R also receives (414) the enforcement message and is the device that performs an enforcement action in response to receipt of the message. In some embodiments, the enforcement action is disabling playback of all content on the playback device. Disabling of playback can also be limited in ways such as, but not limited to, disabling playback of content within certain categories (e.g., a producer, a distributor, an artist, type or format of content, live content such as sports, etc.). Other enforcements may include the reduction of quality or delayed playback. In other embodiments, the enforcement action forces the playback device to display a message such as "do not distribute, copyright protected content" in order to educate the user. The receipt and enforcement of the messages may be secured with the help of the DRM or decryption module used to play back future content. The enforcement message may be encrypted with a key known by the targeted playback device that has been transmitted with the token or is associated with the token but not directly the playback device identity. This may be a secret key or public key where the playback device has the same or matching private key. Additional types of restrictions are contemplated and would be appreciated as appropriate to various applications in accordance with embodiments of the invention. Remedial action to respond to a leak of protected content can be taken without an entity other than the playback device having private token R discovering the source of the leak. In several embodiments, the playback application configures the playback device to respond to the enforcement message with the specified restriction. A system where an enforcement message is broadcast to playback devices in accordance with embodiments of the invention is illustrated in FIG. 5.

In the illustrated system 500, playback devices 502, 504, 506, and 508 (clients 1, 2, 3, and 4) possess different private tokens OKL, UBC, POI, and 1WQ, respectively. A piece of content from playback device 504, having been marked with the device's private token UBC, is compromised and made available to others via some communications medium, such as a network 506 (e.g., peer-to-peer or other sharing distribution network). It is discovered that the piece of content is compromised, such as by scanning or browsing the network 510. In other embodiments, the compromised piece of content was shared directly between parties but is still discovered, by intercept or otherwise. The private token UBC is extracted from the discovered copy of the content. An enforcement message containing the private token UBC is broadcast to all of playback devices 502, 504, 506, and 508 over network 512 without knowing the identity of 504. All playback devices receive the message. The playback device 504 that marks its content with the private token UBC receives the enforcement message restricts itself in some way with respect to playback of content. As discussed further above, restriction can include any of a variety of measures.

The process of extracting the token and reacting with an enforcement message and reaction by the playback device may be over the course of several days, aggregated by several tokens or may otherwise be a quick turn around of minutes or seconds to e.g. interrupt illegal broadcasting during a live event.

Although a specific process and system are discussed above with respect to FIGS. 4 and 5, one skilled in the art will recognize that any of a variety of processes and systems may be utilized to detect and remediate leaked or pirated content using private tokens in accordance with embodiments of the invention.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed is:

1. A method of anonymously tracking a piece of digital content and remediating unauthorized distribution, the method comprising:

generating a private token using a playback device, where the private token comprises an identifier distinguishable from private tokens generated by other playback devices within a plurality of playback devices and the association with the playback device is not shared outside the playback device;

receiving at least a portion of a piece of content using the playback device;

embedding a digital watermark in the at least a portion of the piece of content using the playback device, where the digital watermark includes information including the private token;

detecting an unauthorized copy of the piece of content using the extraction server;

extracting the digital watermark including the private token from the unauthorized copy of the piece of content using an extraction server;

extracting the private token from the digital watermark using the extraction server;

sending the private token from the extraction server to the remediation server;

broadcasting, using a remediation server, an enforcement message containing the private token to the plurality of playback devices including the playback device;

receiving the broadcast enforcement message containing the private token using the playback device; and performing an enforcement action on the playback device in response to the broadcast message when the private token contained in the broadcast message matches the private token on the playback device, where only a playback device that generated the private token within the plurality of playback devices responds to receiving the broadcast message containing the private token.

2. The method of claim 1, wherein generating a private token using a playback device comprises generating a private token using a seed number encrypted with a secret key that is unique and permanently associated with the playback device.

3. The method of claim 1, wherein generating a private token using a playback device comprises generating a private token using a device identifier that is unique to and associated with the device.

4. The method of claim 1, further comprising generating new private tokens in regular intervals using the playback device.

5. The method of claim 1, wherein performing an enforcement action is enforced and executed by an enforcement application on the playback device.

6. The method of claim 5, where the enforcement application is a content decryption module.

7. The method of claim 1, wherein the private token is a public key of a public and private key pair for asymmetric encryption and the enforcement message is secured using the public key to be decrypted with the private key.

8. The method of claim 1 wherein the digital watermark is a human-imperceptible mark on at least one frame of the content.

9. The method of claim 1 wherein the digital watermark is a human-perceptible mark on at least one frame of the content.

10. The method of claim 1 wherein the digital watermark is embedded as meta information in the header of the file containing the digital content.

11. The method of claim 1, wherein detecting an unauthorized copy of the piece of content comprising crawling the internet for unauthorized content using a crawler.

12. The method of claim 11, wherein detecting an unauthorized copy of the piece of content comprising scanning a peer-to-peer network for unauthorized content using a crawler.

13. The method of claim 1, wherein the enforcement action comprises disabling playback of any content on the playback device.

14. The method of claim 1, where the enforcement action comprises displaying a visible message when playing back content on the playback device.

* * * * *